(12) United States Patent
Huang et al.

(10) Patent No.: US 12,395,234 B2
(45) Date of Patent: Aug. 19, 2025

(54) MODE DIVISION DUPLEX FOR ORBITAL ANGULAR MOMENTUM COMMUNICATIONS

(71) Applicant: QUALCOMM Incorporated, San Diego, CA (US)

(72) Inventors: Min Huang, Beijing (CN); Yu Zhang, San Diego, CA (US); Chao Wei, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/254,999

(22) PCT Filed: Feb. 24, 2021

(86) PCT No.: PCT/CN2021/077630
§ 371 (c)(1),
(2) Date: May 30, 2023

(87) PCT Pub. No.: WO2022/178705
PCT Pub. Date: Sep. 1, 2022

(65) Prior Publication Data
US 2024/0031007 A1  Jan. 25, 2024

(51) Int. Cl.
*H04B 7/165* (2006.01)
*H04B 7/0456* (2017.01)
*H04B 7/06* (2006.01)

(52) U.S. Cl.
CPC ........... *H04B 7/165* (2013.01); *H04B 7/0469* (2013.01); *H04B 7/0615* (2013.01)

(58) Field of Classification Search
CPC ...................................................... H04B 7/165
USPC .......................................................... 375/262
See application file for complete search history.

(56) References Cited

U.S. PATENT DOCUMENTS

2021/0234592 A1* 7/2021 Ashrafi ................ H01Q 21/065

FOREIGN PATENT DOCUMENTS

| CN | 110138438 A | 8/2019 |
| CN | 110995299 A | 4/2020 |
| WO | WO-2020262743 A1 | 12/2020 |

OTHER PUBLICATIONS

International Search Report and Written Opinion—PCT/CN2021/077630—ISA/EPO—Oct. 28, 2021.

* cited by examiner

*Primary Examiner* — Lihong Yu
(74) *Attorney, Agent, or Firm* — Guang Y. Zhang; Harrity & Harrity, LLP

(57) ABSTRACT

Various aspects of the present disclosure generally relate to wireless communication. In some aspects, a first wireless communication device may transmit, in a time-frequency resource occasion to a second wireless communication device, a first orbital angular momentum (OAM) signal in a first OAM mode. The first wireless communication device may receive, in the time-frequency resource occasion from the second wireless communication device, a second OAM signal, in a second OAM mode, that is orthogonal to the first OAM signal. Numerous other aspects are described.

30 Claims, 15 Drawing Sheets

MODE DIVISION DUPLEX FOR ORBITAL ANGULAR MOMENTUM COMMUNICATIONS

CROSS-REFERENCE TO RELATED APPLICATION

This Patent Application is a 371 national stage of PCT Application No. PCT/CN2021/077630 filed on Feb. 24, 2021, entitled "MODE DIVISION DUPLEX FOR ORBITAL ANGULAR MOMENTUM COMMUNICATIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for mode division duplex for orbital angular momentum communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless communication device includes transmitting, in a time-frequency resource occasion to a second wireless communication device, a first orbital angular momentum (OAM) signal in a first OAM mode. The method includes receiving, in the time-frequency resource occasion from the second wireless communication device, a second OAM signal, in a second OAM mode, that is orthogonal to the first OAM signal.

In some aspects, a method of wireless communication performed by a first wireless communication device includes generating a first indication indicating a first circle index of a co-axial multi-circle transceiver and a first OAM mode for the first circle index, to use for transmitting OAM signals, and a second circle index of the co-axial multi-circle transceiver and a second OAM mode for the second circle index to use for receiving OAM signals. The method includes transmitting the first indication to a second wireless communication device.

In some aspects, a first wireless communication device for wireless communication includes a memory and one or more processors operatively coupled to the memory, the memory and the one or more processors configured to transmit, in a time-frequency resource occasion to a second wireless communication device, a first OAM signal in a first OAM mode, and receive, in the time-frequency resource occasion from the second wireless communication device, a second OAM signal, in a second OAM mode, that is orthogonal to the first OAM signal.

In some aspects, a first wireless communication device for wireless communication includes a memory and one or more processors operatively coupled to the memory, the memory and the one or more processors configured to generate a first indication indicating a first circle index of a co-axial multi-circle transceiver and a first OAM mode for the first circle index, to use for transmitting OAM signals, and a second circle index of the co-axial multi-circle transceiver and a second OAM mode for the second circle index to use for receiving OAM signals. and transmit the first indication to a second wireless communication device.

In some aspects, a non-transitory computer-readable medium storing a set of instructions for wireless communication includes one or more instructions that, when executed by one or more processors of a first wireless communication device, cause the first wireless communication device to transmit, in a time-frequency resource occasion to a second wireless communication device, a first OAM signal in a first OAM mode, and receive, in the time-frequency resource occasion from the second wireless communication device, a second OAM signal, in a second OAM mode, that is orthogonal to the first OAM signal.

In some aspects, a non-transitory computer-readable medium storing a set of instructions for wireless communication includes one or more instructions that, when executed by one or more processors of a first wireless communication device, cause the first wireless communication device to generate a first indication indicating a first circle index of a co-axial multi-circle transceiver and a first OAM mode for the first circle index, to use for transmitting OAM signals, and a second circle index of the co-axial multi-circle transceiver and a second OAM mode for the second circle index to use for receiving OAM signals, and transmit the first indication to a second wireless communication device.

In some aspects, an apparatus for wireless communication includes means for transmitting, in a time-frequency resource occasion to another apparatus, a first OAM signal in a first OAM mode, and means for receiving, in the time-frequency resource occasion from the other apparatus, a second OAM signal, in a second OAM mode, that is orthogonal to the first OAM signal.

In some aspects, an apparatus for wireless communication includes means for generating a first indication indicating a first circle index of a co-axial multi-circle transceiver and a first OAM mode for the first circle index, to use for transmitting OAM signals, and a second circle index of the co-axial multi-circle transceiver and a second OAM mode for the second circle index to use for receiving OAM signals, and means for transmitting the first indication to another apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
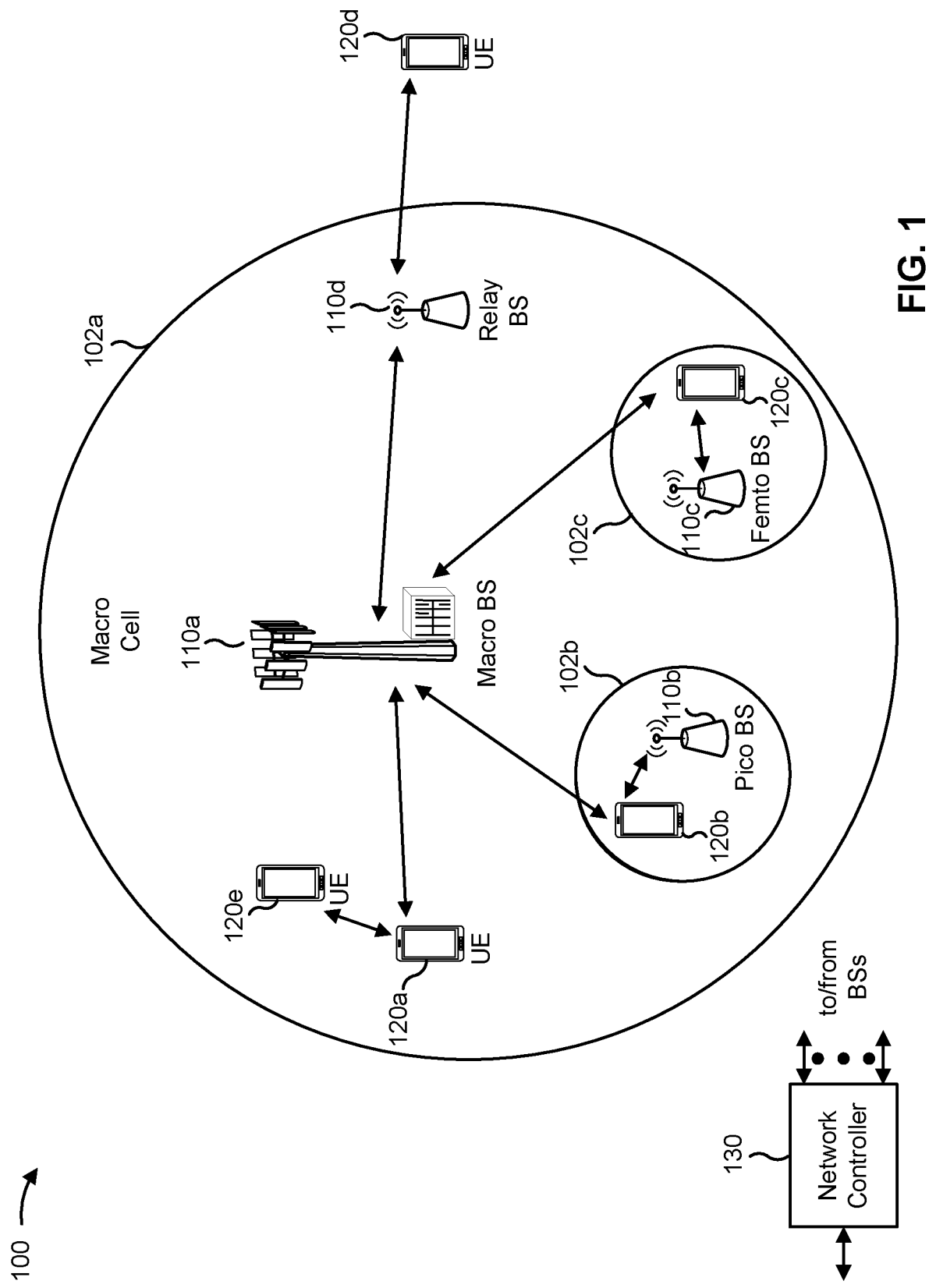
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE).

UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, UE 120 may perform scheduling operations, resource selection operations, and/or other operations described elsewhere herein as being performed by base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
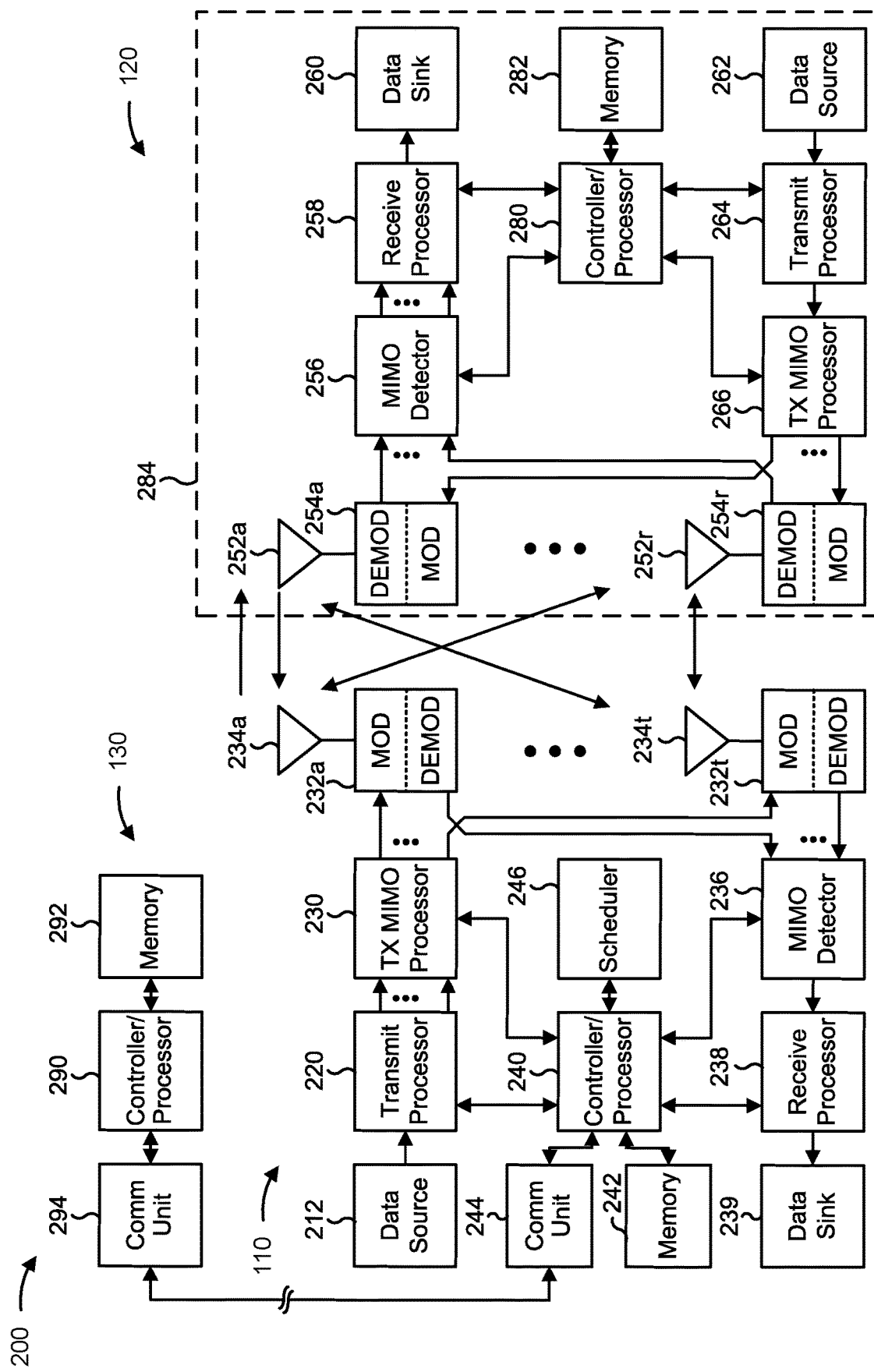
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM) and transmitted to base station 110. In some aspects, a modulator and a demodulator (e.g., MOD/DEMOD 254) of UE 120 may be included in a modem of UE 120. In some aspects, UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-15).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of base station 110 may be included in a modem of base station 110. In some aspects, base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-15).

Controller/processor 240 of base station 110, controller/processor 280 of UE 120, a controller/processor of a wireless communication device, and/or any other component(s) of FIG. 2 may perform one or more techniques associated with mode division duplex (MDD) for orbital angular momentum (OAM) communications, as described in more detail elsewhere herein. In some aspects, a wireless communication device, OAM device, or network node described herein is base station 110, is included in base station 110, or includes one or more components of base station 110 shown in FIG. 2. In some aspects, a wireless communication device, OAM device, or OAM node described herein is UE 120, is included in UE 120, or includes one or more components of UE 120 shown in FIG. 2. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, a first wireless communication device includes means for transmitting, in a time-frequency resource occasion to a second wireless communication device, a first OAM signal in a first OAM mode, and/or means for receiving, in the time-frequency resource occasion from the second wireless communication device, a second OAM signal, in a second OAM mode, that is orthogonal to the first OAM signal. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless communication device includes means for receiving an indication of a first circle index and a first OAM mode for the first circle index to use for transmitting OAM signals, and a second circle index and a second OAM mode for the second circle index to use for receiving OAM signals.

In some aspects, the first wireless communication device includes means for transmitting an indication of a circle index, an OAM mode, or a combination thereof for the first wireless communication device to use for transmitting OAM signals.

In some aspects, the first wireless communication device includes means for selecting the circle index, the OAM mode, or a combination thereof based at least in part on one or more of a quantity of links in transmission directions, a quantity of OAM modes in transmission directions, channel gains of OAM modes, or service traffic in transmission directions.

In some aspects, the first wireless communication device includes means for receiving a response to the indication. In some aspects, the first wireless communication device includes means for receiving an indication of a circle index, an OAM mode, or a combination thereof for the second wireless communication device to use for transmitting OAM signals, and/or means for transmitting a response to the indication.

In some aspects, the first wireless communication device includes means for transmitting a setup request indicating a circle index, an OAM mode, or a combination thereof for the first OAM signal in the first OAM mode and the second OAM signal in the second OAM mode.

In some aspects, the first wireless communication device includes means for receiving a setup request indicating a circle index, an OAM mode, or a combination thereof for the first OAM signal in the first OAM mode and the second OAM signal in the second OAM mode, and/or means for transmitting a response to the setup request.

In some aspects, the first wireless communication device includes means for generating a first indication indicating a first circle index of a co-axial multi-circle transceiver and a first OAM mode for the first circle index, to use for transmitting OAM signals, and a second circle index of the co-axial multi-circle transceiver and a second OAM mode for the second circle index to use for receiving OAM signals, and/or means for transmitting the first indication to a second wireless communication device. In some aspects, the means for the first wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the first wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first wireless communication device includes means for generating a second indication indicating the first circle index and the first OAM mode to use for receiving OAM signals, and the second circle index and the second OAM mode to use for transmitting OAM signals, and/or means for transmitting the second indication to a third wireless communication device that is to communicate with the second wireless communication device.

In some aspects, the first wireless communication device includes means for generating a second indication indicating a third circle index and a third OAM mode for the third circle index to use for transmitting OAM signals, and a fourth circle index and a fourth OAM mode for the fourth circle index to use for receiving OAM signals, and/or means for transmitting the second indication to a third wireless communication device that is to communicate with the second wireless communication device.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

OAM Communications

Figure 3:
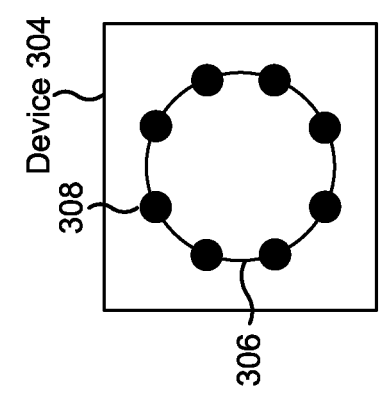
FIG. 3 is a diagram illustrating examples of devices configured for orbital angular momentum (OAM) communications, in accordance with the present disclosure.
Figure 3:
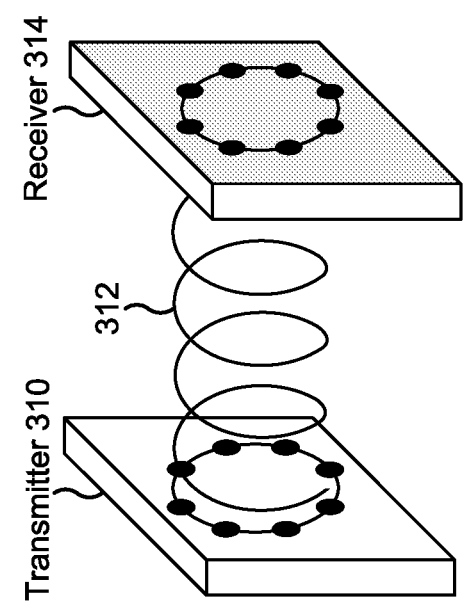

FIG. 3 is a diagram illustrating examples 300 and 302 of devices configured for OAM communications, in accordance with the present disclosure.

An OAM wave is an electromagnetic wave that travels through space with an OAM waveform. The OAM waveform may twist around an axis as is it travels through space, as if to form a helix. An OAM wave may be used for spatial diversity, as one OAM waveform may travel through a different part of space than another OAM wave, if the OAM waves have different OAM modes. An OAM mode may correspond to a particular spatial location for an OAM wave. A first OAM wave may have a first OAM mode and a second OAM wave may have the first OAM mode, or a different, second OAM mode. If the OAM modes for the first OAM wave and the second OAM wave are the same, the first OAM wave and the second OAM wave may travel through the same part of space. If the OAM modes for the first OAM wave and the second OAM wave are different, the first OAM wave and the second OAM wave may travel through different part of space.

Example 300 shows a device 304 configured for OAM communications. Device 304 may have a co-axial circle transceiver, such as a circle transmitter 306 with multiple antennas 308 along the transmitter. Multiple antennas 308 may be referred to as "uniform circular array" (UCA) transmitter antennas. Transmitter 306 may radiate a co-axially propagating (helically twisting) electromagnetic wave that carries a data stream.

Example 302 shows a transmitter 310 transmitting a co-axially propagating wave 312 to receiver 314, which may receive wave 312 with a circle receiver of multiple antennas. Wave 312 may be an OAM waveform with a helical phase in the propagation direction. The helical phase may be of the form $\exp(i\varphi l)$, where $\varphi$ is the azimuthal angle and $l$ is an unbounded integer (referred as an "OAM order"). Traditional electromagnetic beams, such as Gaussian beams, may be considered OAM beams with $l=0$.

Transmitter 310 may transmit multiple coaxially propagating, spatially-overlapping waves (OAM mode $l= \ldots, -2, -1, -, 1, 2, \ldots$), each carrying a separate data stream. Transmitter 310 may orthogonally transmit these multiple waves (of different OAM modes) in the same time-frequency resource. Forming multiple waves of different OAM modes in the same time-frequency resource may be referred to as "OAM multiplexing." OAM multiplexing can greatly improve communication spectrum efficiency with low receiver processing complexity.

OAM Applications

Communications based on OAM multiplexing, due to its capability to provide high-order spatial multiplexing, may be regarded as a potential 6G technology (or 5G enhancement, 5G phase 2, or the like). OAM multiplexing for 6G communication technology may provide a higher data rate than 5G communication technology.

OAM communications may perform well in short and middle-distance fixed communication, especially in a high frequency spectrum (e.g., sub-terrahertz (THz), THz). For example, OAM communications may be used for: wireless backhaul transmissions from a base station to a relay node; fixed wireless access from a base station to a fixed UE; CPE; wide area network bridges; and/or inter-device transmission from a fixed UE to another fixed UE. OAM communications may also be used for inter-server connections in a data center, where the connections include line of sight channels for an mmWave network, wireless crossbars for packet switching, and/or steered beams for transmission and reception.

As indicated above, FIG. 3 provides some examples. Other examples may differ from what is described with regard to FIG. 3.

Example OAM SPP System

Figure 4:
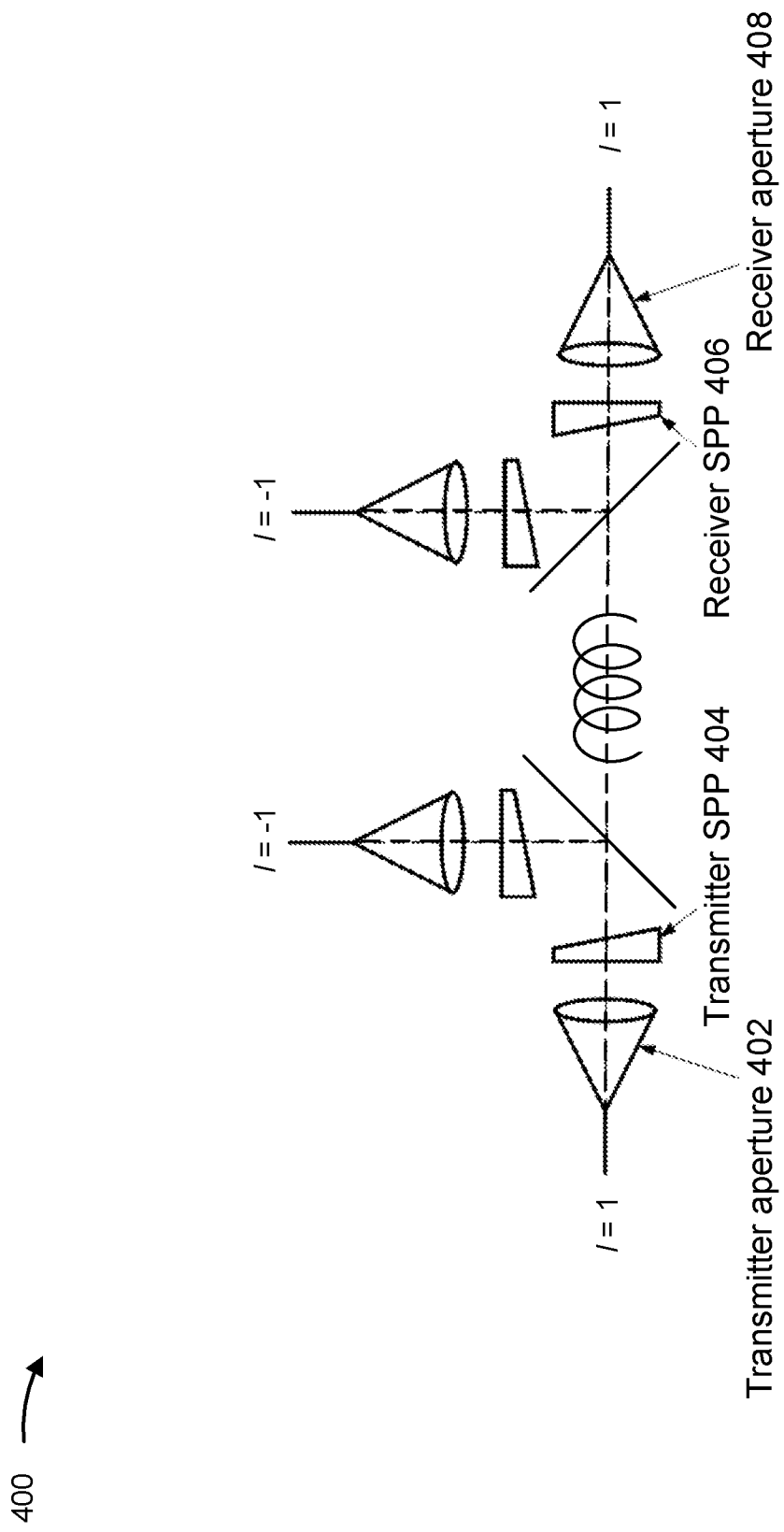
FIG. 4 is a diagram illustrating an example of an OAM-based communication system, in accordance with the present disclosure.

FIG. 4 is a diagram illustrating an example 400 of an OAM-based communication system, in accordance with the present disclosure.

An OAM transmitter may also transmit multiple co-axially propagating, spatially-overlapping waves through a pair of apertures. Example 400 shows a transmitter aperture 402 that transmits a wave that is modulated by a transmitter spiral phase plate (SPP) 404, which may be a spiral-shaped piece of crystal or plastic that is engineered specifically to a desired topological charge and incident wavelength. The wave may be demodulated by a receiver SPP 406 and then received by a receiver aperture 408. The OAM-based communication system may include multiple transmitter apertures that each transmit a spiral wave of one OAM mode. Due to the mutual orthogonality among OAM modes, the wave of one OAM mode cannot be received by the receiver aperture of another OAM mode.

As indicated above, FIG. 4 is provided as an example. Other examples may differ from what is described with regard to FIG. 4.

Example OAM UCA System

Figure 5:
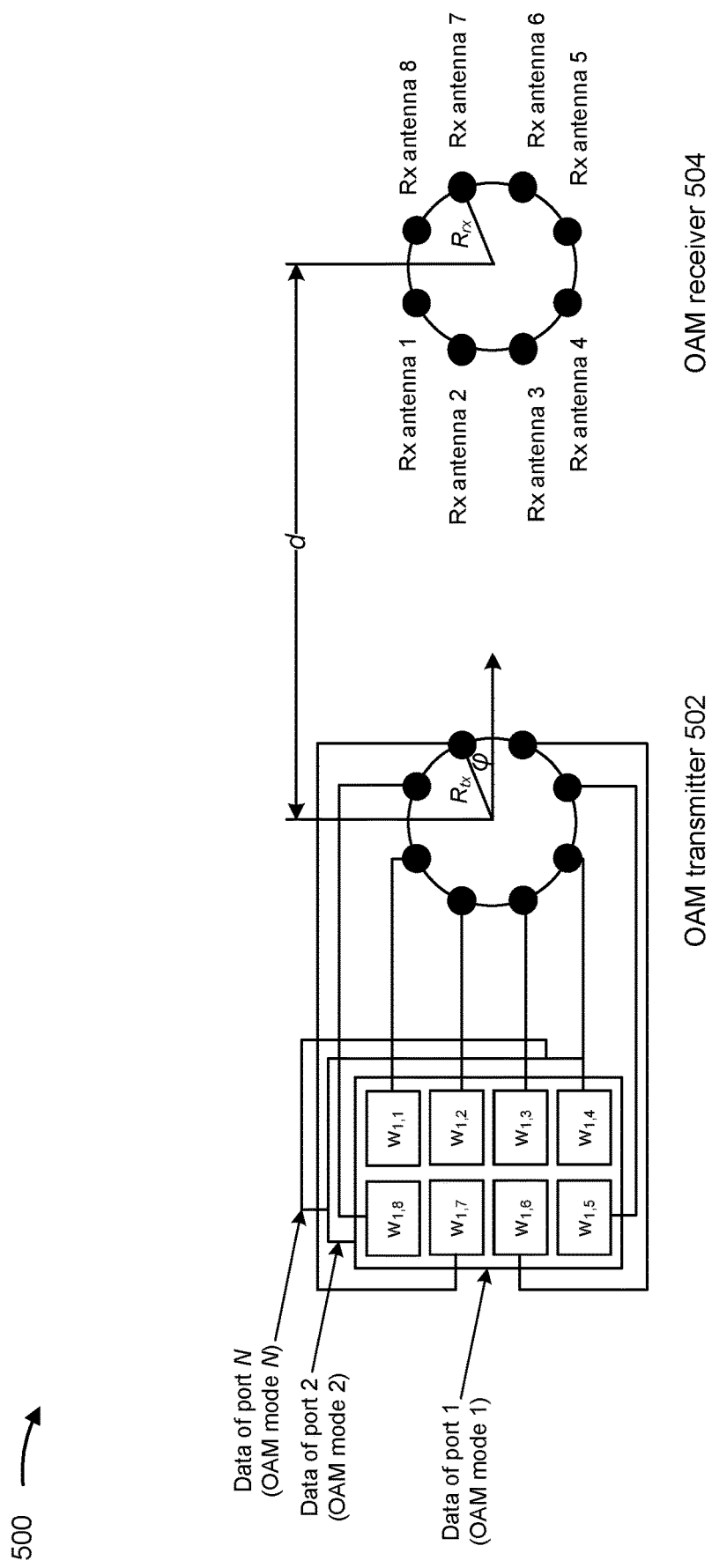
FIG. 5 is a diagram illustrating an example of an OAM-based communication system, in accordance with the present disclosure.

FIG. 5 is a diagram illustrating an example 500 of an OAM-based communication system, in accordance with the present disclosure.

Example 500 shows an OAM-based communication system that includes an OAM transmitter 502 configured with a set of UCA transmit antennas and an OAM receiver 504 configured with a set of UCA receive antennas. The UCA transmit antennas may be evenly arranged in a circle. Similarly, the UCA receive antennas may be evenly arranged in a circle. By multiplying respective OAM-formed weights $w_1 = [w_{1,1}, w_{1,2}, \ldots, w_{1,8}]^T$ onto each antenna, a signal port may be generated. If the weight of each antenna is equal to $\exp(i\varphi l)$, where $\varphi$ is the angle of antenna in the circle and $l$ is the OAM mode index, then a respective OAM-formed port is equivalent to OAM mode $l$. By using different OAM-formed weights $\exp(i\varphi l')$, where $l' \neq l$, multiple OAM modes may be generated.

If a channel matrix H is formed from each transmit antenna to each receive antenna, then for an OAM-formed channel matrix $\hat{H} = H \cdot [w_1, w_2, \ldots, w_L]$, any two columns of $\hat{H}$ are orthogonal. This means that all the OAM channels have no crosstalk. This is why OAM-based communications may efficiently realize high-level spatial multiplexing.

OAM Modes

OAM communications may use SPPs or UCA antennas to transmit multiple orthogonal signals with different OAM modes. SPP-based OAM may generate a continuous spiral wave, and thus can theoretically form an unlimited number of orthogonal OAM modes. However, in practice, due to propagation divergence and one mode per SPP, the number of effective OAM modes may be limited (e.g., 4 modes). UCA-based OAM may generate discrete spiral waves and thus may form a number of OAM modes that is equal to a number of transmit antennas in a circular array. UCA-based OAM may be associated with MIMO whose eigen-based transmit precoding weights and receive combining weights are constantly equal to a DFT matrix, which is irrelevant to communication parameters (distance, aperture size and carrier frequency) and thus can be implemented at a low cost.

As indicated above, FIG. 5 is provided as an example. Other examples may differ from what is described with regard to FIG. 5.

Figure 6:
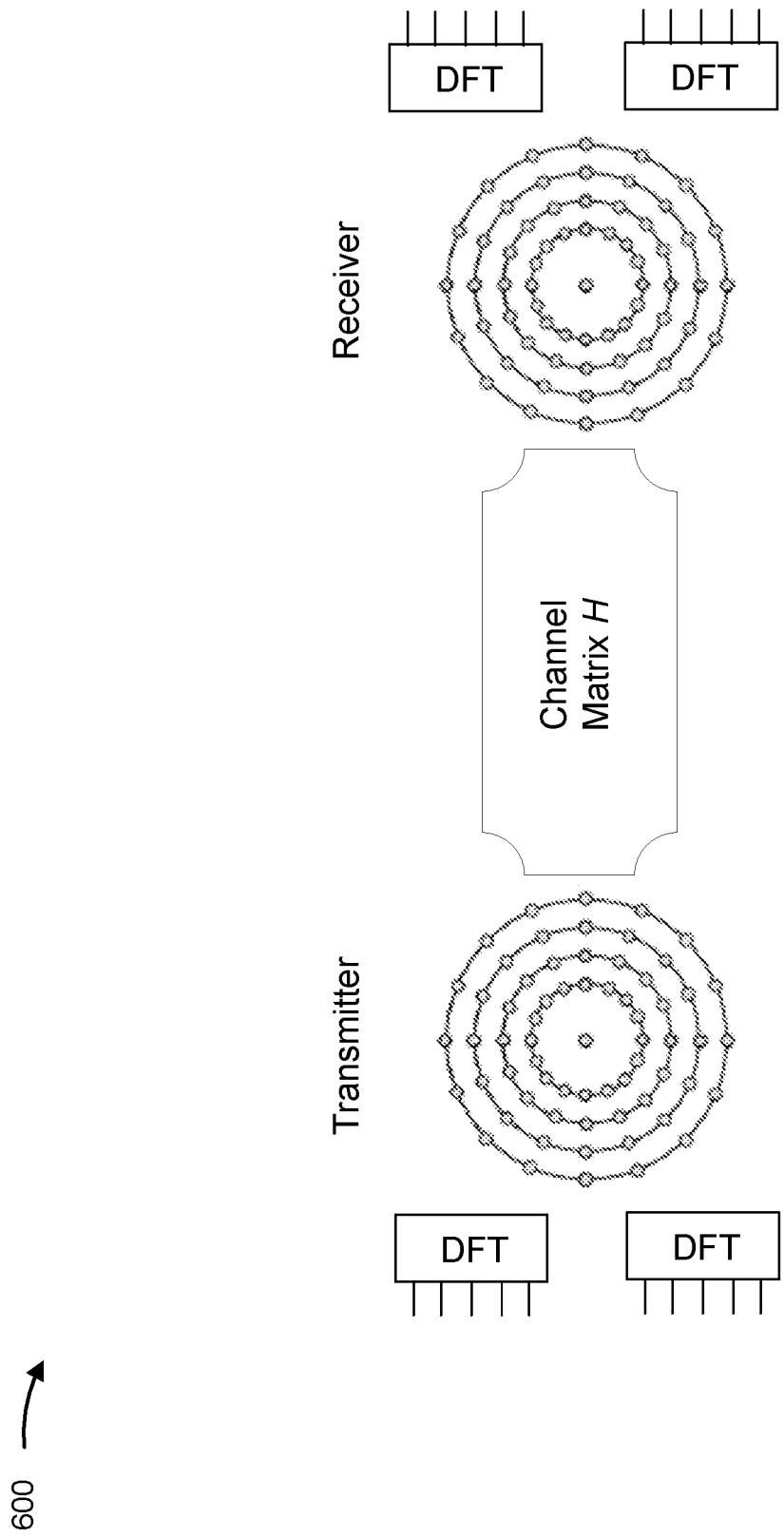
FIG. 6 is a diagram illustrating an example of multi-circle OAM communication, in accordance with the present disclosure.

FIG. 6 is a diagram illustrating an example 600 of multi-circle OAM communication, in accordance with the present disclosure.

Multiple co-axial UCA antenna circles or SPP-based apertures may be deployed at both transmitter and receiver. The co-axial UCA antenna circles may include concentric circles, where some circles are larger and surrounding other circles. The intra-circle streams may be orthogonal. The inter-circle streams may be orthogonal if the streams are different OAM modes and non-orthogonal if the streams have the same OAM mode. For each OAM mode, there may be inter-circle interference. That is, a stream transmitted from one circle may interfere with a stream transmitted from another circle, if the two streams have the same OAM mode. A channel matrix H may be formed from each transmit antenna to each receive antenna, as described above in connection with FIG. 5.

As indicated above, FIG. 6 is provided as an example. Other examples may differ from what is described with regard to FIG. 6.

Figure 7:
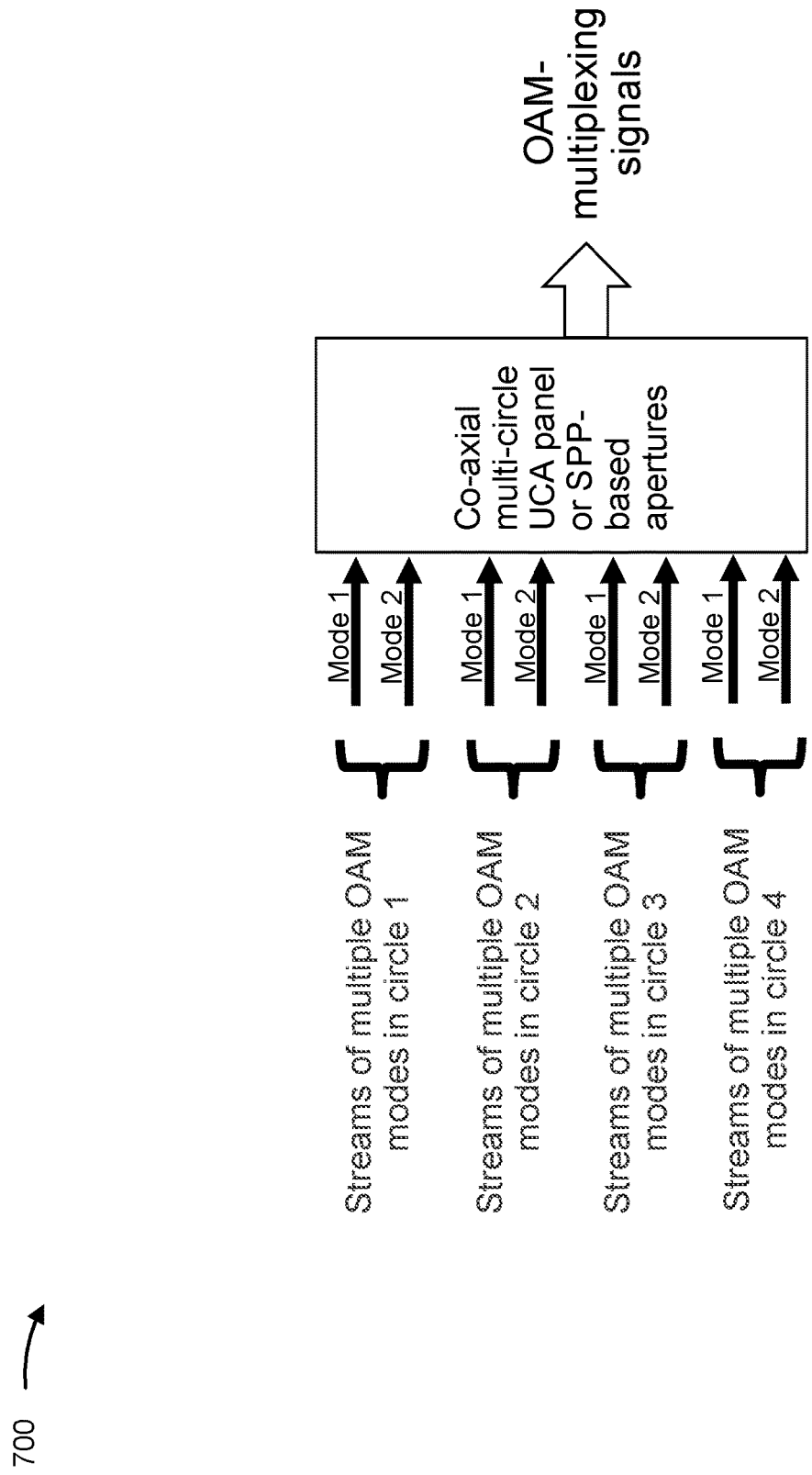
FIG. 7 is a diagram illustrating an example of streams of different OAM modes, in accordance with the present disclosure.

FIG. 7 is a diagram illustrating an example 700 of streams of different OAM modes, in accordance with the present disclosure.

To enable bi-directional transmission between two devices (e.g., between a base station and a UE, between two base stations, or between two UEs), a transmitting device and a receiving device may use frequency-division duplex (FDD) or time-division duplex (TDD). For FDD, the bi-directional transmissions use different frequency resources and the same time resource. For TDD, the bi-directional transmissions use the same frequency resource and different time resources. However, whether FDD or TDD, the bi-directional transmissions use orthogonal time-frequency resources and thus cause spectrum efficiency loss and transmission latency increase.

To improve spectrum efficiency, spatial-division duplex (also called full duplex) has been used. However, with traditional uniform linear array (ULA) or uniform planar array (UPA) antennas, it may be difficult to completely or significantly eliminate self-interference from a transmitted signal to a received signal at the same device.

Mode Division Duplex

According to various aspects described herein, a first co-axial multi-circle OAM device and a second co-axial multi-circle OAM device may use a new duplex mode to perform bi-directional transmissions at the same time-frequency resource, in which self-interference may be canceled without additional cost. For example, the first OAM device may use one circle to transmit a first OAM signal to the second OAM device and another circle to receive a second OAM signal from the second OAM device. The first OAM signal and the second OAM signal may be associated with different OAM modes. Therefore, even if the first OAM signal and the second OAM signal are transmitted on the same time-frequency resource, because the OAM modes are different, the first OAM signal and the second OAM signal are orthogonal and have no mutual interference. The first OAM signal and the second OAM signal may be transmitted as part of a full duplex scheme referred to as mode division duplex (MDD). That is, when the first OAM device uses the corresponding OAM mode's receiving vector (e.g., a DFT vector) to demodulate the second OAM signal from the second OAM device, any OAM signal with a different OAM mode is not demodulated. By using MDD for OAM communications, OAM devices may conserve signaling resources while eliminating interference.

Example 700 shows streams of multiple OAM modes for each of multiple circles. For example, a transmitter may have 8 data streams transmitted from 4 circles, where each circle has 2 possible OAM modes. The transmitter may form the signals using UCA panels or SPP-based apertures. The transmitter may use multiple OAM modes from multiple OAM signals to multiplex OAM signals.

As indicated above, FIG. 7 is provided as an example. Other examples may differ from what is described with regard to FIG. 7.

Examples of MDD for OAM

Figure 8:
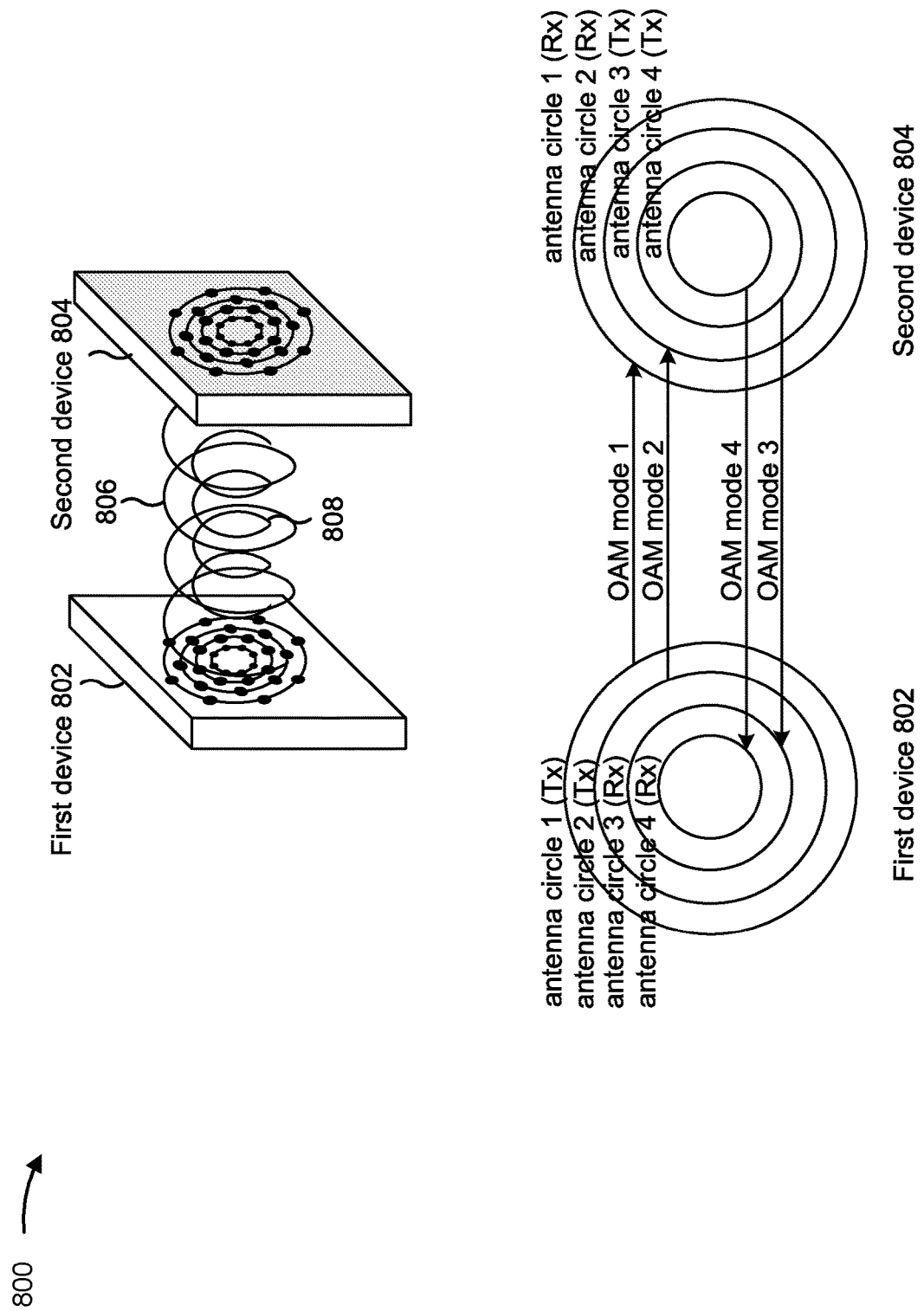
FIG. 8 is a diagram illustrating an example of mode division duplex (MDD) for OAM communications, in accordance with the present disclosure.

FIG. 8 is a diagram illustrating an example 800 of MDD for OAM communications, in accordance with the present disclosure. Example 800 shows a first OAM device 802 and a second OAM device 804. First device 802 and second device 804 may each be configured with a panel of 4 co-axial UCA antennas. First device 802 may transmit a first co-axial wave 806 from one circle of one OAM mode, and second device 804 may transmit a second co-axial wave 808 from another circle of another OAM mode. Alternatively, or additionally, first device 802 and second device 804 may each be configured with 4 pairs of SPPs.

In some aspects, for each OAM mode, a transmitting circle may have a same radius as a receiving circle. For example, first device 802 may have, for example, 4 circles, and second device 804 may have 4 circles. First device 802 may transmit a first signal (first link) from a first circle using OAM mode 1. Second device 804 may receive the first signal with a first circle. First device 802 may transmit a second signal (second link) from a second circle using OAM mode 2. Second device 804 may receive the second signal with a second circle. Second device 804 may transmit a third signal (third link) from a third circle using OAM mode 3. First device 802 may receive the third signal with a third circle. Second device 804 may transmit a fourth signal (fourth link) from a fourth circle using OAM mode 4. First device 802 may receive the fourth signal with a fourth circle. The first signal, the second signal, the third signal, and the fourth signal may all be transmitted in the same time-frequency resource because they are using different OAM modes as part of the MDD communications. Furthermore, there may be no mutual interference.

In some aspects, the network or a UE may select the circle index, the OAM mode, or a combination thereof based at least in part on one or more of a quantity of links in transmission directions, a quantity of OAM modes in transmission directions, channel gains of OAM modes, or service traffic in transmission directions. For example, the UE may select a circle index that has a greater channel gain than another circle index. In another example, the UE may select a greater quantity of OAM modes in a direction if more spatial diversity is necessary. The UE may select a circle index with less service traffic or interference than another circle index.

As indicated above, FIG. 8 is provided as an example. Other examples may differ from what is described with regard to FIG. 8.

Figure 9:
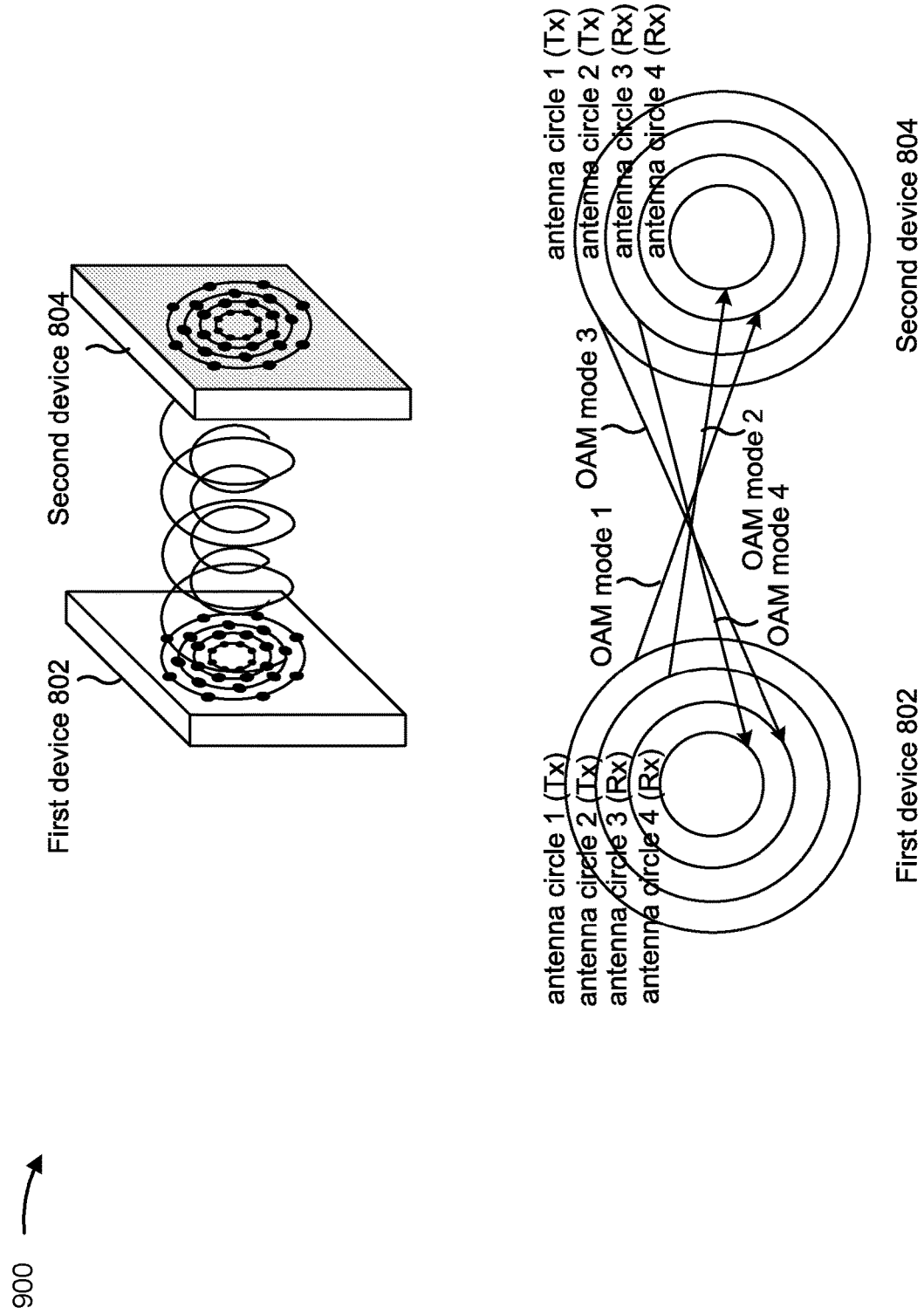
FIG. 9 is a diagram illustrating an example of MDD for OAM communications, in accordance with the present disclosure.

FIG. 9 is a diagram illustrating an example 900 of MDD for OAM communications, in accordance with the present disclosure. Example 900 shows a first OAM device 802 and a second OAM device 804.

In some aspects, first device 802 and second device 804 may be configured to switch circles used for OAM modes, such that the transmitting circle has a different radius than the receiving circle. For example, first device 802 may transmit a first signal from the first circle using OAM mode 1. Second device 804 may receive the first signal with the third circle instead of the first circle. First device 802 may transmit a second signal from the second circle using OAM mode 2. Second device 804 may receive the second signal with the fourth circle. Second device 804 may transmit a third signal from the first circle using OAM mode 3. First device 802 may receive the third signal with the third circle. Second device 804 may transmit a fourth signal from the second circle using OAM mode 4. First device 802 may receive the fourth signal with the fourth circle. Once more, the first signal, the second signal, the third signal, and the fourth signal may all be transmitted in the same time-frequency resource because they are using different OAM device as part of the MDD communications.

As indicated above, FIG. 9 is provided as an example. Other examples may differ from what is described with regard to FIG. 9.

Figure 10:
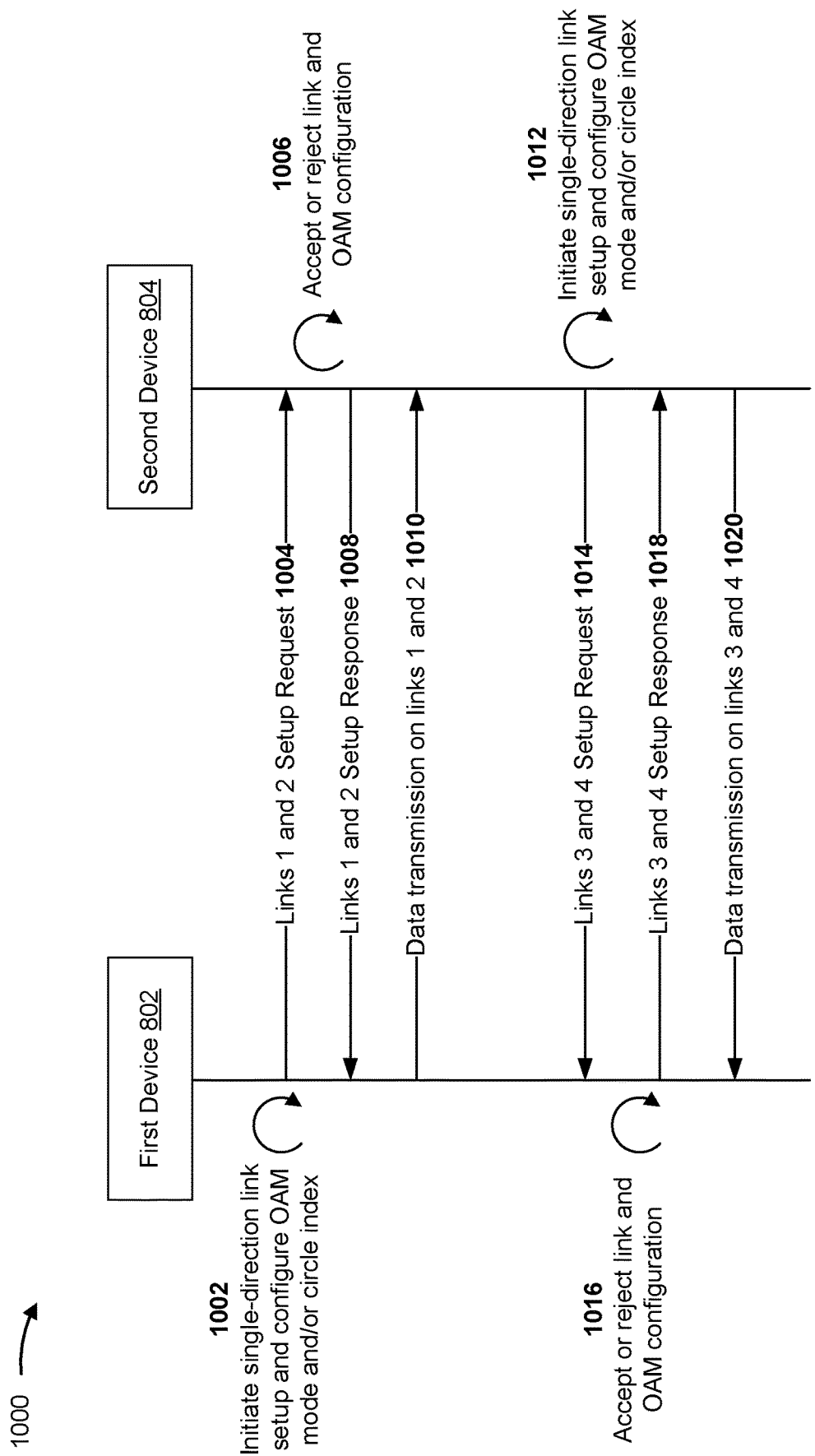
FIG. 10 is a diagram illustrating an example of setting up links for MDD for OAM communications, in accordance with the present disclosure.

FIG. 10 is a diagram illustrating an example 1000 of setting up links for MDD for OAM communications, in accordance with the present disclosure. Example 1000 shows first device 802 and second device 804 setting up links with OAM modes.

In some aspects, the network, via a network manager or supervising network node, may configure the MDD settings for the links between first device 802 and second device 804, including a direction, a transmit circle index, a receive circle index, and an OAM mode of each link. For example, the network may generate a first indication indicating a first circle index of a co-axial multi-circle transceiver and a first OAM mode for the first circle index, to use for transmitting OAM signals (link 1), and a second circle index of the co-axial multi-circle transceiver and a second OAM mode for the second circle index to use for receiving OAM signals (link 2). The network may generate the first indication based at least in part on one or more of a quantity of links in transmission directions, a quantity of OAM modes in transmission directions, and/or channel gains of OAM modes. The network may transmit the first indication to first device 802. The network may generate a second indication indicating the first circle index and the first OAM mode to use for receiving OAM signals, and the second circle index and the second OAM mode to use for transmitting OAM signals. The network may transmit the second indication to second device 804 that is to communicate with first device 802. The network may generate a third indication indicating a third circle index and a third OAM mode for the third circle index to use for transmitting OAM signals (link 3), and a fourth circle index and a fourth OAM mode for the fourth circle index to use for receiving OAM signals (link 4). The network may transmit the third indication to first device 802 and/or second device 804. First device 802 and second device 804 may transmit data on links 1-4, accordingly.

In some aspects, first device 802 and second device 804 may each configure respective transmission links. For example, the transmission links may be sidelink. First device 802 may set up its transmission links (links 1 and 2). For example, as shown by reference number 1002, first device 802 may initiate single-direction link setup. The link setup may include configuring a direction, an OAM mode, and/or a circle index. As shown by reference number 1004, first device 802 may transmit a setup request for links 1 and 2. As shown by reference number 1006, second device 804 may accept or reject an OAM configuration requested for links 1 and 2. As shown by reference number 1008, second device 804 may transmit a response. If the request is accepted, as shown by reference number 1010, first device 802 may transmit data on links 1 and 2 using the requested OAM configuration.

Second device 804 may set up its transmission links (links 3 and 4). As shown by reference number 1012, second device 804 may initiate single-direction link setup. As shown by reference number 1014, second device 804 may transmit a setup request for links 3 and 4. As shown by reference number 1016, first device 802 may accept or reject an OAM configuration requested for links 3 and 4. As shown by reference number 1018, first device 802 may transmit a response. If the request is accepted, as shown by reference number 1020, second device 804 may transmit data on links 3 and 4 using the requested OAM configuration. Because the bi-directional transmissions use the same time-frequency resource, spectrum efficiency is increased. In addition, because the transmission of each direction may be continuous, the latency of transmission may be reduced compared with a TDD system.

As indicated above, FIG. 10 is provided as an example. Other examples may differ from what is described with regard to FIG. 10.

Figure 11:
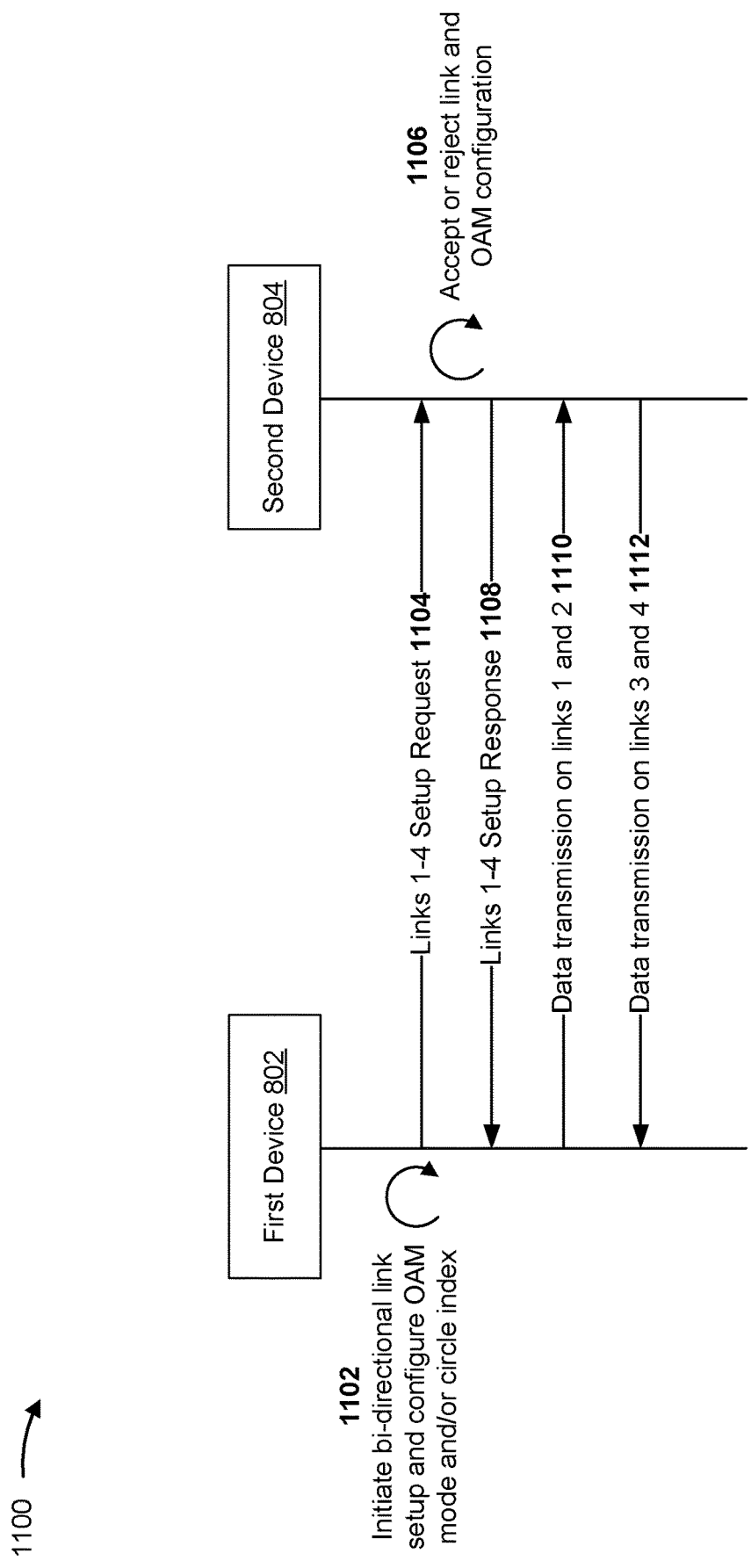
FIG. 11 is a diagram illustrating an example of MDD for OAM communications, in accordance with the present disclosure.

FIG. 11 is a diagram illustrating an example 1100 of MDD for OAM communications, in accordance with the present disclosure. Example 1100 shows first device 802 setting up all the links with OAM modes.

In some aspects, first device 802 may configure all of the transmission links. For example, the transmission links may be downlink and uplink. As shown by reference number 1102, first device 802 may initiate bi-directional link setup. Link setup may include configuring a direction, an OAM mode, and/or a circle index for transmission links of both first device 802 and second device 804. As shown by reference number 1104, first device 802 may transmit a setup request for links 1-4. As shown by reference number 1106, second device 804 may accept or reject an OAM configuration requested for links 1-4. As shown by reference number 1108, second device 804 may transmit a response. If the request is accepted, as shown by reference number 1110, first device 802 may transmit data on links 1 and 2 using the requested OAM configuration. Correspondingly, as shown by reference number 1112, second device 804 may transmit data on links 3 and 4 using the requested OAM configuration.

In some aspects, the number of links and OAM modes of each transmission direction may be flexibly configured or adjusted based at least in part on, for example, a channel gain of each OAM mode and/or service traffic of each transmission direction. By flexibly configuring OAM modes for multiple circles, the first device 802 and/or the second device 804 may conserve time and signaling resources, while improving throughput and reducing interference.

As indicated above, FIG. 11 is provided as an example. Other examples may differ from what is described with regard to FIG. 11.

Figure 12:
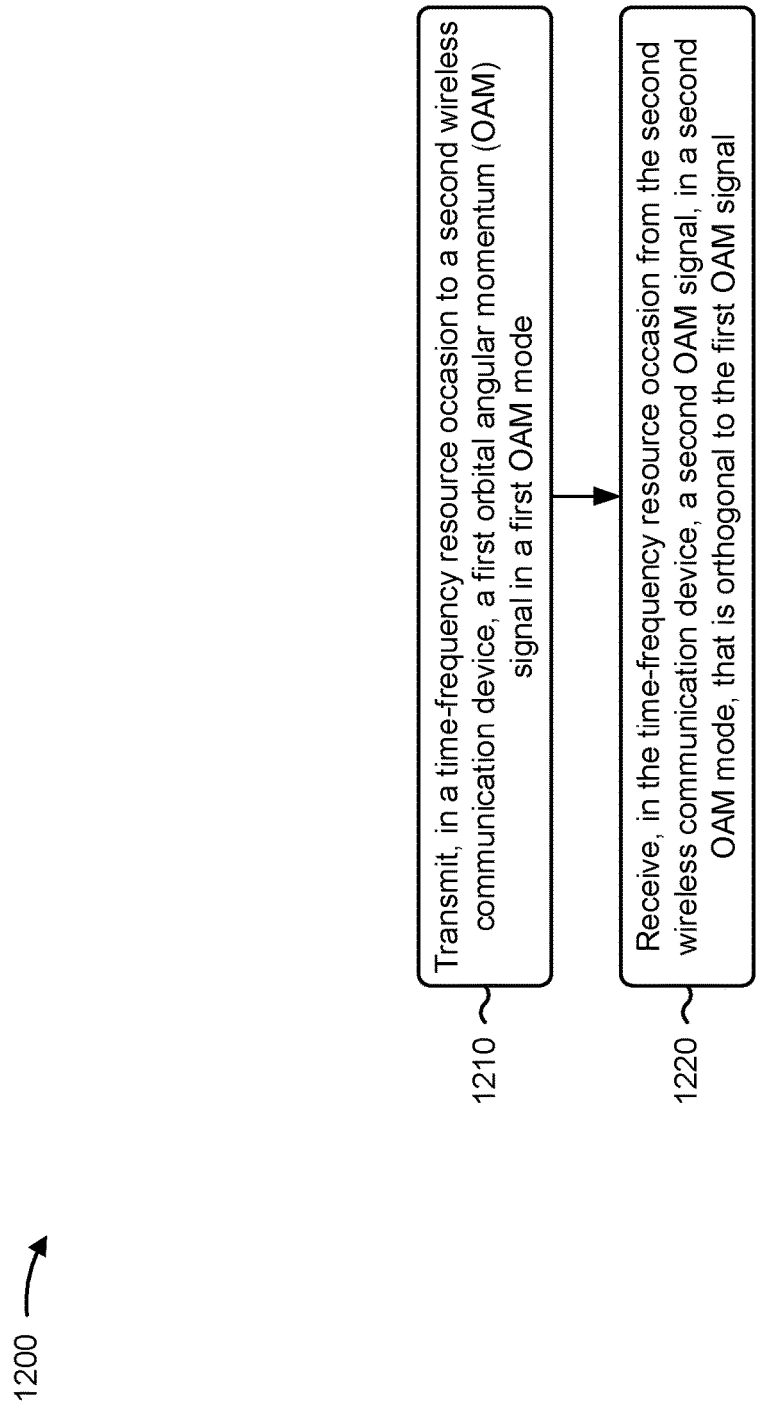
FIG. 12 is a diagram illustrating an example process performed, for example, by a first wireless communication device, in accordance with the present disclosure.

FIG. 12 is a diagram illustrating an example process 1200 performed, for example, by a first wireless communication device, in accordance with the present disclosure. Example process 1200 is an example where the first wireless communication device (e.g., a UE 120 or a base station 110 depicted in FIGS. 1-2, first device 802 or first device 804 depicted in FIGS. 8-11) performs operations associated with MDD for OAM communications.

As shown in FIG. 12, in some aspects, process 1200 may include transmitting, in a time-frequency resource occasion to a second wireless communication device, a first OAM signal in a first OAM mode (block 1210). For example, the first wireless communication device (e.g., using transmission component 1404 depicted in FIG. 14) may transmit, in a time-frequency resource occasion to a second wireless communication device, a first OAM signal in a first OAM mode, as described above.

As further shown in FIG. 12, in some aspects, process 1200 may include receiving, in the time-frequency resource occasion from the second wireless communication device, a second OAM signal, in a second OAM mode, that is orthogonal to the first OAM signal (block 1220). For example, the first wireless communication device (e.g., using reception component 1402 depicted in FIG. 14) may receive, in the time-frequency resource occasion from the second wireless communication device, a second OAM signal, in a second OAM mode, that is orthogonal to the first OAM signal, as described above.

Process 1200 may include additional aspects, such as any single aspect or any combination of aspects described below and/or in connection with one or more other processes described elsewhere herein.

In a first aspect, the first OAM signal is transmitted from antennas of a first circle of a first co-axial multi-circle transceiver, and wherein the second OAM signal is received by antennas of a second circle of the first co-axial multi-circle transceiver.

In a second aspect, alone or in combination with the first aspect, for the first OAM mode, the first circle has a circle index of the first co-axial multi-circle transceiver that matches a circle index of a second co-axial multi-circle transceiver of the second wireless communication device.

In a third aspect, alone or in combination with the first aspect, for the first OAM mode, the first circle has a circle index of the first co-axial multi-circle transceiver that does not match a circle index of a second co-axial multi-circle transceiver of the second wireless communication device.

In a fourth aspect, alone or in combination with one or more of the first through third aspects, process 1200 includes receiving an indication of a first circle index and a first OAM mode for the first circle index to use for transmitting OAM signals, and a second circle index and a second OAM mode for the second circle index to use for receiving OAM signals.

In a fifth aspect, alone or in combination with one or more of the first through fourth aspects, process 1200 includes transmitting an indication of a circle index, an OAM mode, or a combination thereof for the first wireless communication device to use for transmitting OAM signals.

In a sixth aspect, alone or in combination with one or more of the first through fifth aspects, process 1200 includes selecting the circle index, the OAM mode, or a combination thereof based at least in part on one or more of a quantity of links in transmission directions, a quantity of OAM modes in transmission directions, channel gains of OAM modes, or service traffic in transmission directions.

In a seventh aspect, alone or in combination with one or more of the first through sixth aspects, process 1200 includes receiving a response to the indication.

In an eighth aspect, alone or in combination with one or more of the first through seventh aspects, process 1200 includes receiving an indication of a circle index, an OAM mode, or a combination thereof for the second wireless communication device to use for transmitting OAM signals, and transmitting a response to the indication.

In a ninth aspect, alone or in combination with one or more of the first through eighth aspects, process 1200 includes transmitting a setup request indicating a circle index, an OAM mode, or a combination thereof for the first OAM signal in the first OAM mode and the second OAM signal in the second OAM mode.

In a tenth aspect, alone or in combination with one or more of the first through ninth aspects, process 1200 includes receiving a setup request indicating a circle index, an OAM mode, or a combination thereof for the first OAM signal in the first OAM mode and the second OAM signal in the second OAM mode, and transmitting a response to the setup request.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
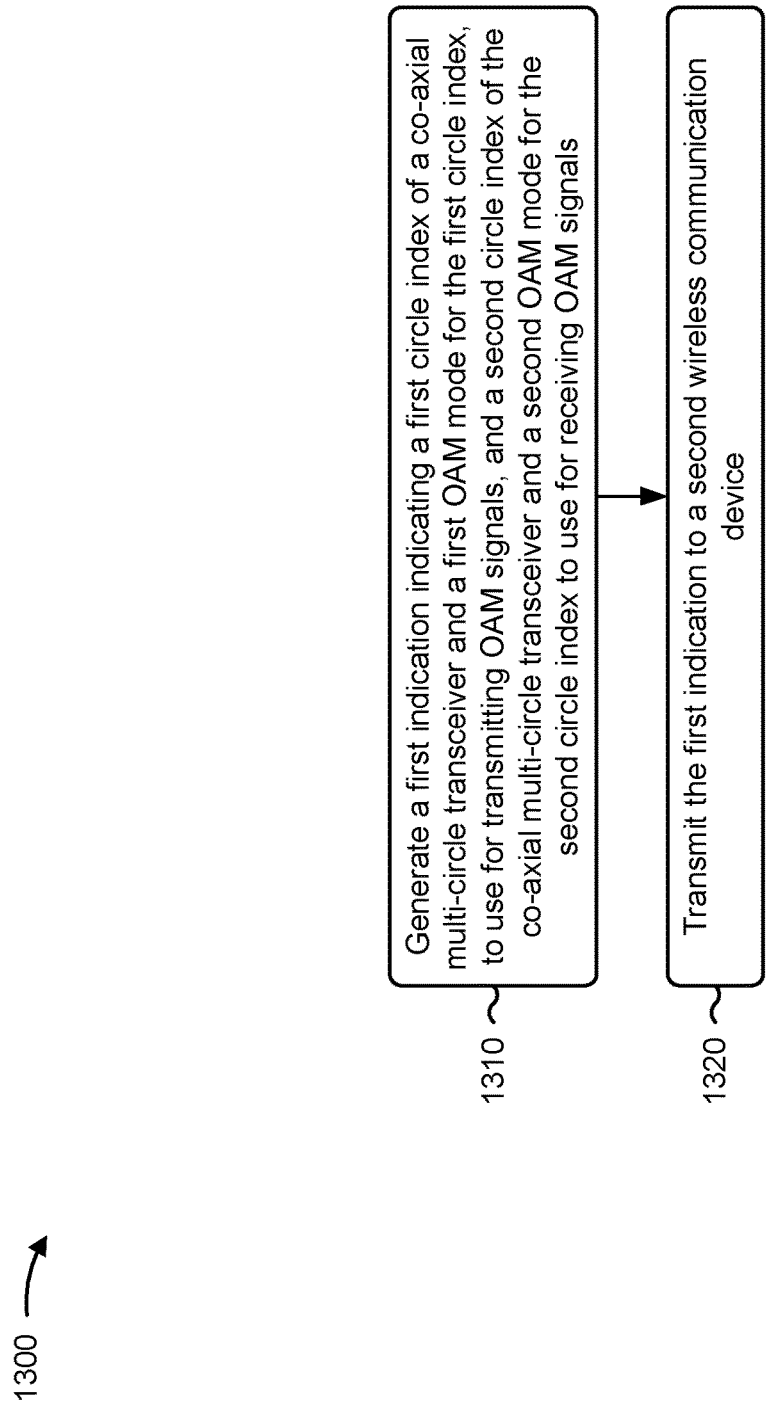
FIG. 13 is a diagram illustrating an example process performed, for example, by a first wireless communication device, in accordance with the present disclosure.

FIG. 13 is a diagram illustrating an example process 1300 performed, for example, by a first wireless communication device, in accordance with the present disclosure. Example process 1300 is an example where the first wireless communication device (e.g., a UE 120 or a base station 110 depicted in FIGS. 1-2, first device 802 or second device 804 depicted in FIGS. 8-11) performs operations associated with MDD for OAM communications.

As shown in FIG. 13, in some aspects, process 1300 may include generating a first indication indicating a first circle index of a co-axial multi-circle transceiver and a first OAM mode for the first circle index, to use for transmitting OAM signals, and a second circle index of the co-axial multi-circle transceiver and a second OAM mode for the second circle index to use for receiving OAM signals (block 1310). For example, the first wireless communication device (e.g., using generation component 1508 depicted in FIG. 15) may generate a first indication indicating a first circle index of a co-axial multi-circle transceiver and a first OAM mode for the first circle index, to use for transmitting OAM signals, and a second circle index of the co-axial multi-circle transceiver and a second OAM mode for the second circle index to use for receiving OAM signals, as described above.

As further shown in FIG. 13, in some aspects, process 1300 may include transmitting the first indication to a second wireless communication device (block 1320). For example, the first wireless communication device (e.g., using transmission component 1504 depicted in FIG. 15) may transmit the first indication to a second wireless communication device, as described above.

Process 1300 may include additional aspects, such as any single aspect or any combination of aspects described below and/or in connection with one or more other processes described elsewhere herein.

In a first aspect, process 1300 includes generating a second indication indicating the first circle index and the first OAM mode to use for receiving OAM signals, and the second circle index and the second OAM mode to use for transmitting OAM signals, and transmitting the second indication to a third wireless communication device that is to communicate with the second wireless communication device.

In a second aspect, alone or in combination with the first aspect, process 1300 includes generating a second indication indicating a third circle index and a third OAM mode for the third circle index to use for transmitting OAM signals, and a fourth circle index and a fourth OAM mode for the fourth circle index to use for receiving OAM signals, and transmitting the second indication to a third wireless communication device that is to communicate with the second wireless communication device.

In a third aspect, alone or in combination with one or more of the first and second aspects, the first indication is generated based at least in part on one or more of a quantity of links in transmission directions, a quantity of OAM modes in transmission directions, channel gains of OAM modes, or service traffic in transmission directions.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
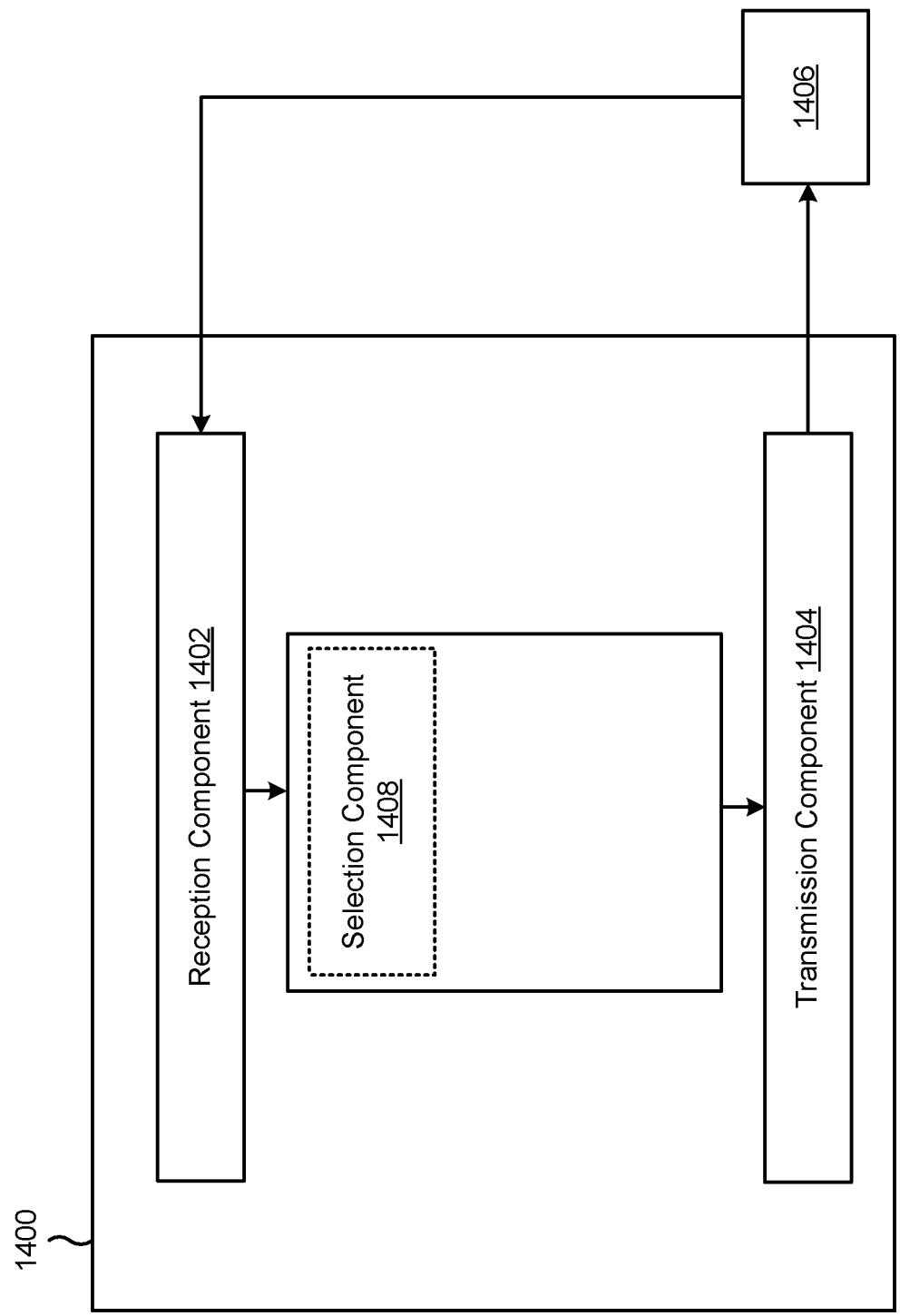
FIGS. 14-15 are block diagrams of example apparatuses for wireless communication, in accordance with the present disclosure.

FIG. 14 is a block diagram of an example apparatus 1400 for wireless communication. The apparatus 1400 may be a first wireless communication device, or a first wireless communication device may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a selection component 1408, among other examples.

In some aspects, the apparatus 1400 may be configured to perform one or more operations described herein in connection with FIGS. 1-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the first wireless communication device described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the first wireless communication device described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the first wireless communication device described above in connection with FIG. 2. In some aspects, the transmission component 1404 may be co-located with the reception component 1402 in a transceiver.

The transmission component 1404 may transmit, in a time-frequency resource occasion to a second wireless communication device, a first OAM signal in a first OAM mode. The reception component 1402 may receive, in the time-frequency resource occasion from the second wireless communication device, a second OAM signal, in a second OAM mode, that is orthogonal to the first OAM signal.

The reception component 1402 may receive an indication of a first circle index and a first OAM mode for the first circle index to use for transmitting OAM signals, and a second circle index and a second OAM mode for the second circle index to use for receiving OAM signals. The transmission component 1404 may transmit an indication of a circle index, an OAM mode, or a combination thereof for the first wireless communication device to use for transmitting OAM signals.

The selection component 1408 may select the circle index, the OAM mode, or a combination thereof based at least in part on one or more of a quantity of links in transmission directions, a quantity of OAM modes in transmission directions, channel gains of OAM modes, or service traffic in transmission directions.

The reception component 1402 may receive a response to the indication. The reception component 1402 may receive an indication of a circle index, an OAM mode, or a combination thereof for the second wireless communication device to use for transmitting OAM signals transmitting a response to the indication.

The transmission component 1404 may transmit a setup request indicating a circle index, an OAM mode, or a combination thereof for the first OAM signal in the first OAM mode and the second OAM signal in the second OAM mode. The reception component 1402 may receive a setup request indicating a circle index, an OAM mode, or a combination thereof for the first OAM signal in the first OAM mode and the second OAM signal in the second OAM mode. The transmission component 1404 may transmit a response to the setup request.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
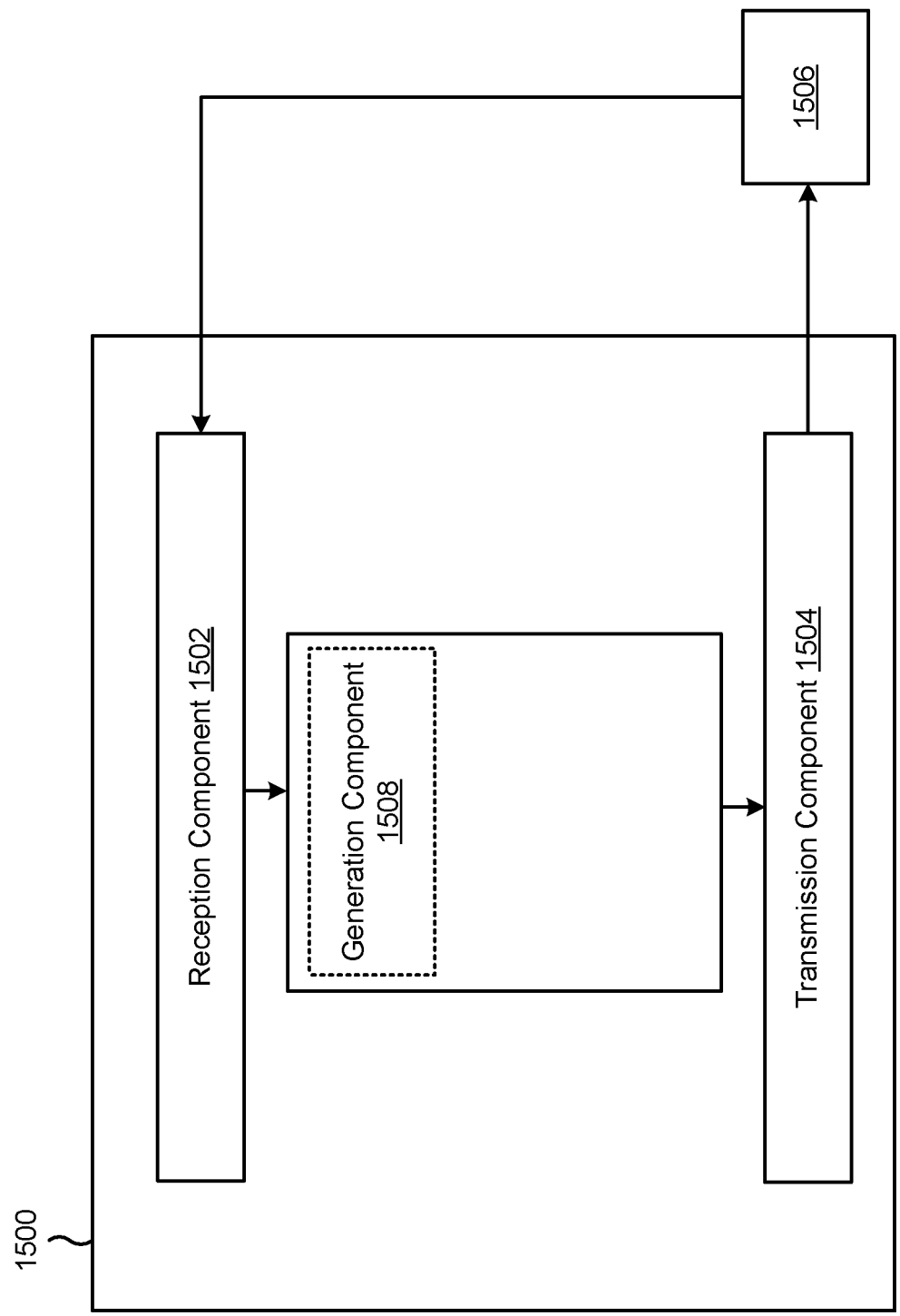

FIG. 15 is a block diagram of an example apparatus 1500 for wireless communication. The apparatus 1500 may be a first wireless communication device, or a first wireless communication device may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a generation component 1508, among other examples.

In some aspects, the apparatus 1500 may be configured to perform one or more operations described herein in connection with FIGS. 1-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the first wireless communication device described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the first wireless communication device described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the first wireless communication device described above in connection with FIG. 2. In some aspects, the transmission component 1504 may be co-located with the reception component 1502 in a transceiver.

The generation component 1508 may generate a first indication indicating a first circle index of a co-axial multi-circle transceiver and a first OAM mode for the first circle index, to use for transmitting OAM signals, and a second circle index of the co-axial multi-circle transceiver and a second OAM mode for the second circle index to use for receiving OAM signals. The transmission component 1504 may transmit the first indication to a second wireless communication device.

The generation component 1508 may generate a second indication indicating the first circle index and the first OAM mode to use for receiving OAM signals, and the second circle index and the second OAM mode to use for transmitting OAM signals. The transmission component 1504 may transmit the second indication to a third wireless communication device that is to communicate with the second wireless communication device.

The generation component 1508 may generate a second indication indicating a third circle index and a third OAM mode for the third circle index to use for transmitting OAM signals, and a fourth circle index and a fourth OAM mode for the fourth circle index to use for receiving OAM signals. The transmission component 1504 may transmit the second indication to a third wireless communication device that is to communicate with the second wireless communication device.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a first wireless communication device, comprising: transmitting, in a time-frequency resource occasion to a second wireless communication device, a first orbital angular momentum (OAM) signal in a first OAM mode; and receiving, in the time-frequency resource occasion from the second wireless communication device, a second OAM signal, in a second OAM mode, that is orthogonal to the first OAM signal.

Aspect 2: The method of Aspect 1, wherein the first OAM signal is transmitted from antennas of a first circle of a first co-axial multi-circle transceiver, and wherein the second OAM signal is received by antennas of a second circle of the first co-axial multi-circle transceiver.

Aspect 3: The method of Aspect 2, wherein, for the first OAM mode, the first circle has a circle index of the first co-axial multi-circle transceiver that matches a circle index of a second co-axial multi-circle transceiver of the second wireless communication device.

Aspect 4: The method of Aspect 2, wherein, for the first OAM mode, the first circle has a circle index of the first co-axial multi-circle transceiver that does not match a circle index of a second co-axial multi-circle transceiver of the second wireless communication device.

Aspect 5: The method of any of Aspects 1-4, further comprising receiving an indication of a first circle index and a first OAM mode for the first circle index to use for transmitting OAM signals, and a second circle index and a second OAM mode for the second circle index to use for receiving OAM signals.

Aspect 6: The method of any of Aspects 1-5, further comprising transmitting an indication of a circle index, an OAM mode, or a combination thereof for the first wireless communication device to use for transmitting OAM signals.

Aspect 7: The method of Aspect 6, further comprising selecting the circle index, the OAM mode, or a combination thereof based at least in part on one or more of a quantity of links in transmission directions, a quantity of OAM modes in transmission directions, channel gains of OAM modes, or service traffic in transmission directions.

Aspect 8: The method of Aspect 7, further comprising receiving a response to the indication.

Aspect 9: The method of any of Aspects 1-8, further comprising receiving an indication of a circle index, an OAM mode, or a combination thereof for the second wireless communication device to use for transmitting OAM signals; and transmitting a response to the indication.

Aspect 10: The method of any of Aspects 1-9, further comprising transmitting a setup request indicating a circle index, an OAM mode, or a combination thereof for the first OAM signal in the first OAM mode and the second OAM signal in the second OAM mode.

Aspect 11: The method of any of Aspects 1-10, further comprising: receiving a setup request indicating a circle index, an OAM mode, or a combination thereof for the first OAM signal in the first OAM mode and the second OAM signal in the second OAM mode; and transmitting a response to the setup request.

Aspect 12: A method of wireless communication performed by a first wireless communication device, comprising: generating a first indication indicating a first circle index of a co-axial multi-circle transceiver and a first orbital angular momentum (OAM) mode for the first circle index, to use for transmitting OAM signals, and a second circle index of the co-axial multi-circle transceiver and a second OAM mode for the second circle index to use for receiving OAM signals; and transmitting the first indication to a second wireless communication device.

Aspect 13: The method of Aspect 12, further comprising: generating a second indication indicating the first circle index and the first OAM mode to use for receiving OAM signals, and the second circle index and the second OAM mode to use for transmitting OAM signals; and transmitting the second indication to a third wireless communication device that is to communicate with the second wireless communication device.

Aspect 14: The method of Aspect 12 or 13, further comprising: generating a second indication indicating a third circle index and a third OAM mode for the third circle index to use for transmitting OAM signals, and a fourth circle index and a fourth OAM mode for the fourth circle index to use for receiving OAM signals; and transmitting the second indication to a third wireless communication device that is to communicate with the second wireless communication device.

Aspect 15: The method of any of Aspects 12-14, wherein the first indication is generated based at least in part on one or more of a quantity of links in transmission directions, a quantity of OAM modes in transmission directions, channel gains of OAM modes, or service traffic in transmission directions.

Aspect 16: An apparatus for wireless communication at a device, comprising a processor; memory coupled with the processor; and instructions stored in the memory and executable by the processor to cause the apparatus to perform the method of one or more Aspects of Aspects 1-15.

Aspect 17: A device for wireless communication, comprising a memory and one or more processors coupled to the memory, the memory and the one or more processors configured to perform the method of one or more Aspects of Aspects 1-15.

Aspect 18: An apparatus for wireless communication, comprising at least one means for performing the method of one or more Aspects of Aspects 1-15.

Aspect 19: A non-transitory computer-readable medium storing code for wireless communication, the code comprising instructions executable by a processor to perform the method of one or more Aspects of Aspects 1-15.

Aspect 20: A non-transitory computer-readable medium storing a set of instructions for wireless communication, the set of instructions comprising one or more instructions that, when executed by one or more processors of a device, cause the device to perform the method of one or more Aspects of Aspects 1-15.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device for wireless communication, comprising:
   one or more memories; and
   one or more processors coupled to the one or more memories, the one or more memories and the one or more processors, individually or collectively configured to:
      receive, from a network node, an indication indicating a first circle index of a first multi-circle transceiver and a first orbital angular momentum (OAM) mode for transmitting OAM signals;
      transmit, in a time-frequency resource occasion to a second wireless communication device and using antennas of a first circle of the first multi-circle transceiver, a first OAM signal in the first OAM mode; and
      receive, in the time-frequency resource occasion from the second wireless communication device and using antennas of a second circle of the first multi-circle transceiver, a second OAM signal, in a second OAM mode, that is orthogonal to the first OAM signal, wherein the first circle has a different radius than the second circle.

2. The first wireless communication device of claim 1, wherein the first multi-circle transceiver is a first co-axial multi-circle transceiver.

3. The first wireless communication device of claim 2, wherein, for the first OAM mode, the first circle index matches a second circle index of a second co-axial multi-circle transceiver of the second wireless communication device.

4. The first wireless communication device of claim 2, wherein, for the first OAM mode, the first circle index does not match a second circle index of a second co-axial multi-circle transceiver of the second wireless communication device.

5. The first wireless communication device of claim 1, wherein the one or more processors are further configured to receive, from the network node, an indication of a second circle index and the second OAM mode, the second OAM mode for the second circle index to use for receiving the OAM signals.

6. The first wireless communication device of claim 1, wherein the one or more processors are further configured to transmit an indication of a circle index, an OAM mode, or a combination thereof for the first wireless communication device to use for transmitting the OAM signals.

7. The first wireless communication device of claim 6, wherein the one or more processors are further configured to select the circle index, the OAM mode, or the combination thereof based at least in part on one or more of a quantity of links in transmission directions, a quantity of OAM modes in the transmission directions, channel gains of OAM modes, or service traffic in the transmission directions.

8. The first wireless communication device of claim 7, wherein the one or more processors are further configured to receive a response to the indication of the circle index, the OAM mode, or the combination thereof.

9. The first wireless communication device of claim 1, wherein the one or more processors are further configured to:
receive an indication of a circle index, an OAM mode, or a combination thereof for the second wireless communication device to use for transmitting the OAM signals; and
transmit a response to the indication of the circle index, the OAM mode, or the combination thereof.

10. The first wireless communication device of claim 1, wherein the one or more processors are further configured to transmit a setup request indicating a circle index, an OAM mode, or a combination thereof for the first OAM signal in the first OAM mode and the second OAM signal in the second OAM mode.

11. The first wireless communication device of claim 1, wherein the one or more processors are further configured to:
receive a setup request indicating a circle index, an OAM mode, or a combination thereof for the first OAM signal in the first OAM mode and the second OAM signal in the second OAM mode; and
transmit a response to the setup request.

12. The first wireless communication device of claim 1, wherein the network node is a supervising network node that configures mode division duplex (MDD) settings for links between the first wireless communication device and the second wireless communication device.

13. A method of wireless communication performed by a first wireless communication device, comprising:
receiving, from a network node, an indication indicating a first circle index of a first multi-circle transceiver and a first orbital angular momentum (OAM) mode for transmitting OAM signals;
transmitting, in a time-frequency resource occasion to a second wireless communication device and using antennas of a first circle of the first multi-circle transceiver, a first OAM signal in the first OAM mode; and
receiving, in the time-frequency resource occasion from the second wireless communication device and using antennas of a second circle of the first multi-circle transceiver, a second OAM signal, in a second OAM mode, that is orthogonal to the first OAM signal, wherein the first circle has a different radius than the second circle.

14. The method of claim 13, wherein the first multi-circle transceiver is a first co-axial multi-circle transceiver.

15. The method of claim 14, wherein, for the first OAM mode, the first circle index matches a second circle index of a second co-axial multi-circle transceiver of the second wireless communication device.

16. The method of claim 14, wherein, for the first OAM mode, the first circle index does not match a second circle index of a second co-axial multi-circle transceiver of the second wireless communication device.

17. The method of claim 13, further comprising receiving, from the network node, an indication of a second circle index and the second OAM mode, the second OAM mode for the second circle index to use for receiving the OAM signals.

18. The method of claim 13, further comprising transmitting an indication of a circle index, an OAM mode, or a combination thereof for the first wireless communication device to use for transmitting the OAM signals.

19. The method of claim 18, further comprising selecting the circle index, the OAM mode, or the combination thereof based at least in part on one or more of a quantity of links in transmission directions, a quantity of OAM modes in the transmission directions, channel gains of OAM modes, or service traffic in the transmission directions.

20. The method of claim 19, further comprising receiving a response to the indication of the circle index, the OAM mode, or the combination thereof.

21. The method of claim 13, further comprising receiving an indication of a circle index, an OAM mode, or a combination thereof for the second wireless communication device to use for transmitting the OAM signals; and
transmitting a response to the indication of the circle index, the OAM mode, or the combination thereof.

22. The method of claim 13, further comprising transmitting a setup request indicating a circle index, an OAM mode, or a combination thereof for the first OAM signal in the first OAM mode and the second OAM signal in the second OAM mode.

23. The method of claim 13, further comprising:
receiving a setup request indicating a circle index, an OAM mode, or a combination thereof for the first OAM signal in the first OAM mode and the second OAM signal in the second OAM mode; and
transmitting a response to the setup request.

24. A non-transitory computer-readable medium storing a set of instructions for wireless communication, the set of instructions comprising:
one or more instructions that when executed by one or more processors of a first wireless communication device, cause the first wireless communication device to:
receive, from a network node, an indication indicating a first circle index of a first multi-circle transceiver and a first orbital angular momentum (OAM) mode for transmitting OAM signals;
transmit, in a time-frequency resource occasion to a second wireless communication device and using antennas of a first circle of the first multi-circle transceiver, a first OAM signal in the first OAM mode; and
receive, in the time-frequency resource occasion from the second wireless communication device and using antennas of a second circle of the first multi-circle transceiver, a second OAM signal, in a second OAM mode, that is orthogonal to the first OAM signal, wherein the first circle has a different radius than the second circle.

25. The non-transitory computer-readable medium of claim 24, wherein the first multi-circle transceiver is a first co-axial multi-circle transceiver.

26. The non-transitory computer-readable medium of claim 25, wherein, for the first OAM mode, the first circle index matches a second circle index of a second co-axial multi-circle transceiver of the second wireless communication device.

27. The non-transitory computer-readable medium of claim 25, wherein, for the first OAM mode, the first circle index does not match a second circle index of a second co-axial multi-circle transceiver of the second wireless communication device.

28. The non-transitory computer-readable medium of claim 24, wherein the one or more instructions further cause the first wireless communication device to receive, from the network node, an indication of a second circle index and the second OAM mode, the second OAM mode for the second circle index to use for receiving the OAM signals.

29. The non-transitory computer-readable medium of claim 24, wherein the one or more instructions further cause the first wireless communication device to transmit an indication of a circle index, an OAM mode, or a combination thereof for the first wireless communication device to use for transmitting the OAM signals.

30. An apparatus for wireless communication at a first wireless communication device, comprising:
  means for receiving, from a network node, an indication indicating a first circle index of a first multi-circle transceiver and a first orbital angular momentum (OAM) mode for transmitting OAM signals;
  means for transmitting, in a time-frequency resource occasion to a second wireless communication device and using antennas of a first circle of the first multi-circle transceiver, a first OAM signal in the first OAM mode; and
  means for receiving, in the time-frequency resource occasion from the second wireless communication device and using antennas of a second circle of the first multi-circle transceiver, a second OAM signal, in a second OAM mode, that is orthogonal to the first OAM signal, wherein the first circle has a different radius than the second circle.

\* \* \* \* \*